United States Patent
Yang

(10) Patent No.: US 11,582,828 B2
(45) Date of Patent: Feb. 14, 2023

(54) METHOD AND DEVICE FOR CONTROLLING RRC STATE, AND COMPUTER STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/685,390

(22) Filed: Nov. 15, 2019

(65) Prior Publication Data

US 2020/0084825 A1    Mar. 12, 2020

Related U.S. Application Data

(63) Continuation of application No. PCT/CN2018/081646, filed on Apr. 2, 2018.

(51) Int. Cl.
| | |
|---|---|
| H04W 76/27 | (2018.01) |
| H04W 76/19 | (2018.01) |
| H04W 76/28 | (2018.01) |
| H04W 76/30 | (2018.01) |
| H04W 76/11 | (2018.01) |

(52) U.S. Cl.
CPC .......... *H04W 76/27* (2018.02); *H04W 76/11* (2018.02); *H04W 76/19* (2018.02); *H04W 76/28* (2018.02); *H04W 76/30* (2018.02)

(58) Field of Classification Search
CPC ..... H04W 76/27; H04W 76/30; H04W 76/11; H04W 76/19; H04W 76/28
See application file for complete search history.

(56) References Cited

U.S. PATENT DOCUMENTS

| 10,681,767 B2 * | 6/2020 | Kim ...................... H04W 76/34 |
| 10,904,941 B2 * | 1/2021 | Kim ...................... H04W 76/18 |
| 2015/0245406 A1 | 8/2015 | Johansson et al. |
| 2015/0264168 A1 | 9/2015 | Kawaguchi |

(Continued)

FOREIGN PATENT DOCUMENTS

| CN | 105898894 | 8/2016 |
| CN | 106233767 | 12/2016 |

(Continued)

OTHER PUBLICATIONS

Translation of WO-2018056718-A1 (Year: 2018).*

(Continued)

*Primary Examiner* — Nishant Divecha
(74) *Attorney, Agent, or Firm* — Hodgson Russ LLP

(57) ABSTRACT

Disclosed are a method and device for controlling an RRC state, and a computer storage medium. The method includes: sending, by a terminal device, a first RRC message to a network device, the first RRC message comprising an RRC connection resume request message; receiving, by the terminal device, a second RRC message sent by the network device, the second RRC message carrying first indication information which is indicative of a target RRC state of the terminal device; and entering, by the terminal device, the target RRC state based on the first indication information.

6 Claims, 4 Drawing Sheets

(56) References Cited

U.S. PATENT DOCUMENTS

| | | | |
|---|---|---|---|
| 2017/0332431 A1* | 11/2017 | Kim | H04W 72/048 |
| 2018/0270792 A1* | 9/2018 | Park | H04W 76/28 |
| 2019/0037635 A1* | 1/2019 | Guo | H04W 76/19 |
| 2019/0045482 A1* | 2/2019 | Lee | H04W 76/27 |
| 2019/0274074 A1* | 9/2019 | Lee | H04W 76/27 |
| 2019/0289661 A1* | 9/2019 | Chen | H04W 72/1284 |
| 2020/0275512 A1* | 8/2020 | Wu | H04W 76/27 |
| 2020/0351723 A1* | 11/2020 | Kim | H04W 68/005 |
| 2021/0144793 A1* | 5/2021 | Kim | H04W 76/18 |

FOREIGN PATENT DOCUMENTS

| | | | |
|---|---|---|---|
| CN | 106658758 | 5/2017 | |
| CN | 106686749 | 5/2017 | |
| CN | 106793170 | 5/2017 | |
| CN | 106961747 | 7/2017 | |
| CN | 107318176 | 11/2017 | |
| CN | 107360561 | 11/2017 | |
| CN | 107666692 | 2/2018 | |
| EP | 3624549 | 3/2021 | |
| JP | 7086110 B2 | 6/2022 | |
| KR | 20170087054 | 7/2017 | |
| KR | 20180018455 A | 2/2018 | |
| RU | 2575259 | 2/2016 | |
| WO | WO-2018056718 A1 * | 3/2018 | H04W 36/00 |
| WO | 2019191884 | 10/2019 | |

OTHER PUBLICATIONS

WIPO, ISR for PCT/CN2018/081646, dated Jan. 2, 2019.
3GPP, 3rd Generation Partnership Project; Technical Specification Group Radio Access Network; Evolved Universal Terrestrial Radio Access (E-UTRA); Radio Resource Control (RRC); Protocol specification (Release 14), Sep. 2016.
ETSI MCC, Report of 3GPP TWG2 meeting #95 (R2-166054), Aug. 22, 2016.
EPO, Extended European Search Report for Appl. No. 18913785.4, dated Jun. 29, 2020.
Huawei, HiSilicon, 3GPP TSG-RAN WG2 meeting #95bis (R2-166629), Oct. 10, 2016.
Samsung, 3GPP TSG-RAN WG2 meeting #97 (R2-1701529), Feb. 13, 2017.
Xiaomi, 3GPP TSG-RAN NR meeting #99bis (R2-1711035), Oct. 9, 2017.
3GPP, 3GPP TS 38.300 V15.1.0, Mar. 2018.
SIPO, First Office Action for CN Application No. 201911330061.3, dated Nov. 3, 2020.
ISDEC, Office Action for CA Application No. 3065573, dated Feb. 25, 2021.
INTEL Corporation, "TP on agreed NR Inactive aspects," 3GPP TSG RAN WG2 Meeting#101, R2-1802929, resubmission of R2-1800913, Feb. 2018, 10 pages.
ISDEC, Office Action for CA Application No. 3064490, dated Jun. 3, 2021.
INAPI, Office Action for CL Application No. 201903827, dated Jul. 20, 2021.
EPO, Extended European Search Report for EP Application No. 21155903.4, dated May 27, 2021.
FSIP, Office Action for RU Application No. 2019141621/07, dated Jun. 30, 2021.
EPO, Notice of Opposition for EP Application No. 18913785.4, Aug. 23, 2021.
IPI, Office Action for IN Application No. 201917047125, dated Feb. 26, 2021.
EPO, Communication Pursuant to Article 94(3) EPC issued to EP Application No. 21155903.4, dated Mar. 30, 2022.
INAPI, Resolution of Notification of the Expert Response issued to CL Application No. 2019-003827, Apr. 11, 2022.
ILPO, Notice of Defects in IL Patent Application No. 270757, Feb. 10, 2022.
JPO, Notice of Reasons for Refusal issued to JP Application No. 2019-564532, dated Jan. 25, 2022.
Nokia, 3GPP TSG-RAN WG2, #99bis, R2-1711483, "RRC Connection Release and Inactivation Procedures", Oct. 2017.
Catt, 3GPP TSG-RAN WG2, Meeting #NR AH2, R2-1706400, "Open Issues on State Transition from Inactive to Connected", Jun. 2017.
Ericsson, 3GPP TSG-RAN WG2, #100, Tdoc R2-1713301, "NR RRC States overview and remaining open Issues", Dec. 2017.
KIPO, Notification of Reason for Refusal issued to KR Application No. 10-2019-7034365, dated Mar. 2, 2022.
Catt, 3GPP TSG-RAN WG3, NR AdHoc, R3-172377, "Periodic RNA Update", Jun. 2017.
EPO, Summons to attend oral proceedings for EP Application No. 18913785.4, Jun. 14, 2022.
Huawei et al., "Remaining issues on State transition between RRC Connected and Inactive," 3GPP TSG-RAN WG2 Meeting# 101, R2-1803250 (revision of R2-1800493), Feb. 2018.
Ericsson, "NR RRC States overview and remaining open issues," 3GPP TSG-RAN WG2 #101, Tdoc R2-1802361 (Resubmission of R2-1800419), Feb. 2018.
Ericsson, "Corrections to Inactive to Other State procedures over F1," 3GPP TSG RAN WG3 NR AdHoc 1801, R3-180424, Jan. 2018.
VIVO, "Remaining FFS Issues on RRC Connection Control," 3GPP TSG-RAN WG2 Meeting #99bis, R2-1710934, Oct. 2017.
DGIP, Office Action for ID Application No. P00202000115, dated Jul. 11, 2022.
IP Vietnam, Office Action for Vietnam Application No. 1-2019-06664, dated Sep. 29, 2022.
KIPRIS, Office Action for KR Application No. 10-2019-7034365, dated Sep. 26, 2022.
INAPI, Notice of Allowance for Chilean Application No. 201903827, dated Oct. 5, 2022.

* cited by examiner

METHOD AND DEVICE FOR CONTROLLING RRC STATE, AND COMPUTER STORAGE MEDIUM

CROSS REFERENCE TO RELATED APPLICATION

The present application is a continuation application of International Application No. PCT/CN2018/081646, filed Apr. 2, 2018, the entire disclosure of which is incorporated herein by reference.

TECHNICAL FIELD

The present disclosure relates to wireless communication technologies, and more particularly to a method and device for controlling a radio resource control (RRC) state, and a computer storage medium.

BACKGROUND

In order to meet people's pursuit for rate, delay, high-speed mobility, efficacy of services as well as the diversity and complexity of services in the future life, the International Standards Organization of the $3^{rd}$ Generation Partnership Project (3GPP) has started the study of the 5th Generation (5G) mobile communication technologies.

The main application of 5G mobile communication technologies includes Enhanced Mobile Broadband (eMBB), Ultra Reliable Low Latency Communication (URLLC) and massive Machine Type Communication (mMTC).

In the 5G network environment, a new RRC state, i.e., an RRC inactive (RRC_INACTIVE) state, is defined for reduction of air interface signaling, fast resume of wireless connections and data services. This state is different from an RRC idle (RRC_IDLE) state and an RRC connected (RRC_CONNECTED) state.

When user Equipment (UE) is in an RRC_INACTIVE state, a network side will configure a Radio Access Network (RAN) paging area for the UE by dedicated signaling. The RAN paging area may be one or more cells. The network side will not be notified of the movement of the UE within the area and the mobility behavior in an idle state is followed, namely, the principle of cell reselection is followed. When the UE moves out of the paging area configured by the RAN, the UE is triggered to resume the RRC connection and re-acquire the paging area configured by the RAN. When downlink data arrives at the UE, a base station (such as gNB) that maintains the connection between the RAN and a Core Network (CN) for the UE triggers all cells in the RAN paging area to send paging messages to the UE, so that the UE in the INACTIVCE state can resume the RRC connection and receive data.

Therefore, as for the transition of the UE from the INACTIVE state to the RRC connection state, there are three situations:

First, downlink data is transmitted to the UE and the network side initiates paging on the side of RAN to prompt the UE to enter the connected state.

Second, the UE itself initiates an RAN location area update, such as a periodic RAN location update or a cross-region location update.

Third, the UE has needs for transmitting uplink data, which allows the UE to enter the connected state.

At present, the control of the RRC state of the UE by the network side lacks flexibility and has low efficiency.

SUMMARY

To solve the above technical problem, embodiments of the present disclosure provide a method and device for controlling an RRC state and a computer storage medium.

The method for controlling an RRC state provided by an embodiment of the present disclosure includes:

sending, by a terminal device, a first RRC message to a network device, the first RRC message including an RRC connection resume request message;

receiving, by the terminal device, a second RRC message sent by the network device, the second RRC message carrying first indication information which is indicative of a target RRC state of the terminal device; and entering, by the terminal device, the target RRC state based on the first indication information.

In an embodiment of the present disclosure, if the target RRC state is an RRC inactive state and the second RRC message does not carry configuration information corresponding to the RRC inactive state, after entering the RRC inactive state, the terminal device uses locally stored configuration information that corresponds to the RRC inactive state.

In an embodiment of the present disclosure, if the target RRC state is an RRC inactive state and the second RRC message carries configuration information corresponding to the RRC inactive state, after entering the RRC inactive state, the terminal device uses the configuration information that is carried in the second RRC message and corresponds to the RRC inactive state.

In an embodiment of the present disclosure, the configuration information corresponding to the RRC inactive state includes at least one of I-RNTI, RAN notification area, RAN discontinuous reception cycle (RAN DRX cycle), periodic RAN notification area update timer.

In an embodiment of the present disclosure, the second RRC message includes an RRC connection resume message, an RRC connection release message, or a newly defined RRC message.

In an embodiment of the present disclosure, the first RRC message carries indication information for indicating a reason for the RRC connection resume, wherein the indication information for indicating the reason for the RRC connection resume is used by the network device to determine the target RRC state of the terminal device in a connection resume procedure.

In an embodiment of the present disclosure, the target RRC state is an RRC connected state, an RRC inactive state, or an RRC idle state.

The method for controlling an RRC state provided by an embodiment of the present disclosure includes:

receiving, by a network device, a first RRC message sent by a terminal device, the first RRC message including an RRC connection resume request message;

sending, by the network device, a second RRC message to the terminal device, the second RRC message carrying first indication information which is indicative of a target RRC state of the terminal device, so that the terminal device enters the target RRC state based on the first indication information.

In an embodiment of the present disclosure, if the target RRC state is an RRC inactive state, configuration information corresponding to the RRC inactive state is or is not carried in the second RRC message.

In an embodiment of the present disclosure, the configuration information corresponding to the RRC inactive state includes at least one of I-RNTI, RAN notification area, RAN DRX cycle, periodic RAN notification area update timer.

In an embodiment of the present disclosure, the second RRC message includes an RRC connection resume message, an RRC connection release message, or a newly defined RRC message.

In an embodiment of the present disclosure, the first RRC message carries indication information for indicating a reason for the RRC connection resume, wherein the indication information for indicating the reason for the RRC connection resume is used by the network device to determine the target RRC state of the terminal device in a connection resume procedure.

In an embodiment of the present disclosure, the target RRC state is an RRC connected state, an RRC inactive state, or an RRC idle state.

The device for controlling an RRC state provided by an embodiment of the present disclosure includes:

a sending unit configured to send to a network device a first RRC message which includes an RRC connection resume request message;

a receiving unit configured to receive a second RRC message sent by the network device, the second RRC message carrying first indication information which is indicative of a target RRC state of the terminal device; and a control unit configured to control the terminal device to enter the target RRC state based on the first indication information.

In an embodiment of the present disclosure, if the target RRC state is an RRC inactive state and the second RRC message does not carry configuration information corresponding to the RRC inactive state, after entering the RRC inactive state, the terminal device uses locally stored configuration information that corresponds to the RRC inactive state.

In an embodiment of the present disclosure, if the target RRC state is an RRC inactive state and the second RRC message carries configuration information corresponding to the RRC inactive state, after entering the RRC inactive state, the terminal device uses the configuration information that is carried in the second RRC message and corresponds to the RRC inactive state.

In an embodiment of the present disclosure, the configuration information corresponding to the RRC inactive state includes at least one of I-RNTI, RAN notification area, RAN DRX cycle, periodic RAN notification area update timer.

In an embodiment of the present disclosure, the second RRC message includes an RRC connection resume message, an RRC connection release message, or a newly defined RRC message.

In an embodiment of the present disclosure, the first RRC message carries indication information for indicating a reason for the RRC connection resume, wherein the indication information for indicating the reason for the RRC connection resume is used by the network device to determine the target RRC state of the terminal device in a connection resume procedure.

In an embodiment of the present disclosure, the target RRC state is an RRC connected state, an RRC inactive state, or an RRC idle state.

The device for controlling an RRC state provided by an embodiment of the present disclosure includes:

a receiving unit configured to receive a first RRC message sent by a terminal device, the first RRC message including an RRC connection resume request message; and a sending unit configured to send a second RRC message to the terminal device, wherein the second RRC message carries first indication information which is indicative of a target RRC state of the terminal device, so that the terminal device enters the target RRC state based on the first indication information.

In an embodiment of the present disclosure, if the target RRC state is an RRC inactive state, configuration information corresponding to the RRC inactive state is or is not carried in the second RRC message.

In an embodiment of the present disclosure, the configuration information corresponding to the RRC inactive state includes at least one of I-RNTI, RAN notification area, RAN DRX cycle, periodic RAN notification area update timer.

In an embodiment of the present disclosure, the second RRC message includes an RRC connection resume message, an RRC connection release message, or a newly defined RRC message.

In an embodiment of the present disclosure, the first RRC message carries indication information for indicating a reason for the RRC connection resume, and the device further includes:

a determining unit configured to determine the target RRC state of the terminal device in a connection resume procedure based on the indication information for indicating the reason for the RRC connection resume.

In an embodiment of the present disclosure, the target RRC state is an RRC connected state, an RRC inactive state, or an RRC idle state.

The computer storage medium provided by an embodiment of the present disclosure has computer executable instructions stored thereon which, when executed by a processor, carry out the foregoing methods for controlling the RRC state.

In the technical solutions of the embodiments of the present disclosure, a terminal device sends a first RRC message to a network device, the first RRC message including an RRC connection resume request message. The terminal device receives a second RRC message sent by the network device, wherein the second RRC message carries first indication information which is indicative of a target RRC state of the terminal device. The terminal device enters the target RRC state based on the first indication information. With the technical solutions of the embodiments of the present disclosure, in the initiating of an RRC connection resume by an UE, a target RRC state of the terminal is controlled by a network side, and thus the transition of the RRC state of the terminal is controlled. Further, configuration information used when the terminal enters an RRC inactive state is negotiated, thereby achieving controlling and managing of the RRC state.

BRIEF DESCRIPTION OF THE DRAWINGS

The accompanying drawings, which constitute a part of the present application, provide further understanding of the present disclosure. Exemplary embodiments of the present disclosure together with the descriptions thereof serve to explain the disclosure and are not intended to be restrictive of the present disclosure.

DETAILED DESCRIPTION

In order to understand features and technical contents of the embodiments of the present disclosure in more detail, the implementation of the embodiments of the present disclosure will be described in detail below with reference to the accompanying drawings. The drawings are provided for illustrative purposes only and are not intended to limit the embodiments of the disclosure.

The technical solutions of the embodiments of the present disclosure are mainly applied to a 5G mobile communication system. Of course, technical solutions of embodiments of the present disclosure are not limited to the 5G mobile communication system but can be applied to other types of mobile communication systems. The main application scenarios in the 5G mobile communication system will be described as follows:

1) the eMBB scenario: eMBB is intended to allow users to obtain multimedia contents, services and data and its service demand is growing rapidly. Since eMBB may be deployed in various scenarios, such as indoors, urban areas and rural areas, there will be great differences in its service capabilities and requirements. Therefore, services are analyzed in combination with specific deployment scenarios.

2) the URLLC scenario: typical applications of URLLC include industrial automation, power automation, telemedicine operations, and traffic security, and so on.

3) the mMTC scenario: the URLLC includes typical characteristics of high connection density, small data volume, delay-insensitive service, low cost and long service life of modules.

Three kinds of RRC states in the 5G network environment will be described below:

1) RRC_IDLE state: the mobility refers to the UE based cell reselection and paging is initiated by a CN and a paging area is configured by the CN. There is no UE AS context on a base station side. There is no RRC connection.

2) RRC_CONNECTED state: there is an RRC connection and there is a UE AS context on the base station and the UE sides. The network side knows that the location of the UE is at a specific cell level. The mobility is controlled by the network side. Unicast data can be transmitted between the UE and the base station.

3) RRC_INACTIVE state: the mobility refers to the UE-based cell reselection and there is a connection between a CN and an RAN and UE AS contexts exist on a certain base station; paging is triggered by the RAN and a RAN-based paging area is managed by the RAN and the network side knows that the location of the UE is at a level of the RAN based paging area.

Figure 1:
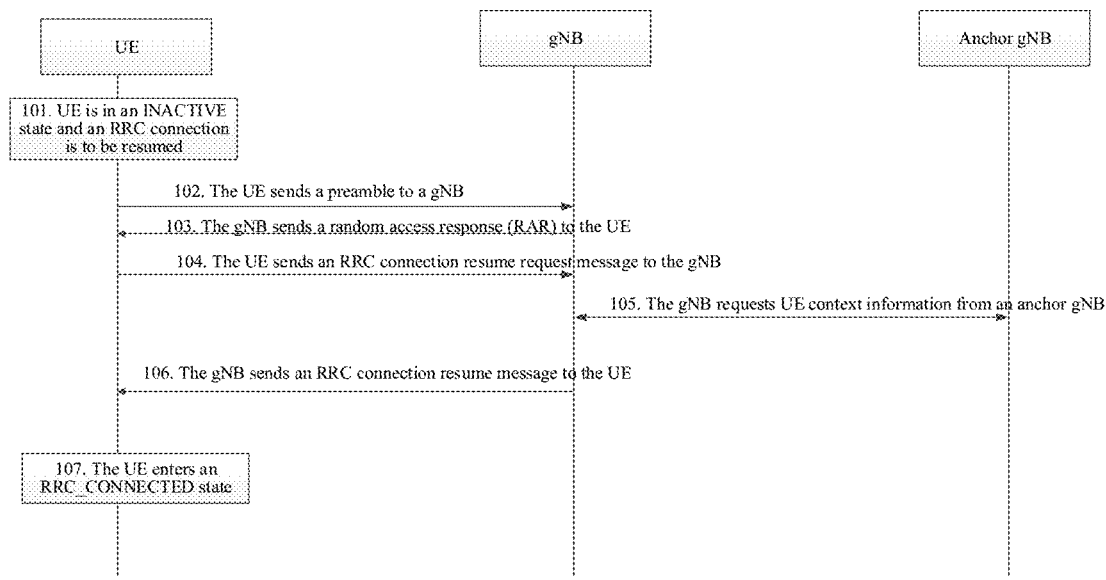
FIG. 1 is a schematic diagram of an RRC connection resume procedure.

FIG. 1 is a schematic diagram of an RRC connection resume procedure. As shown in FIG. 1, the RRC connection resume procedure includes the following procedures:

In step 101, an UE is in an INACTIVE state and an RRC connection is to be resumed.

In step 102, the UE sends a preamble to a gNB.

In step 103, the gNB sends a random access response (RAR) to the UE.

In step 104, the UE sends an RRC connection resume request message to the gNB.

In step 105, the gNB requests UE context information from an anchor gNB.

In step 106, the gNB sends an RRC connection resume message to the UE.

In step 107, the UE enters an RRC_CONNECTED state.

The purpose of the embodiment of the present disclosure is to control, by a network side, the UE to enter any one of the RRC_CONNECTED state, an RRC_INACTIVE state and an RRC_IDLE state.

Figure 2:
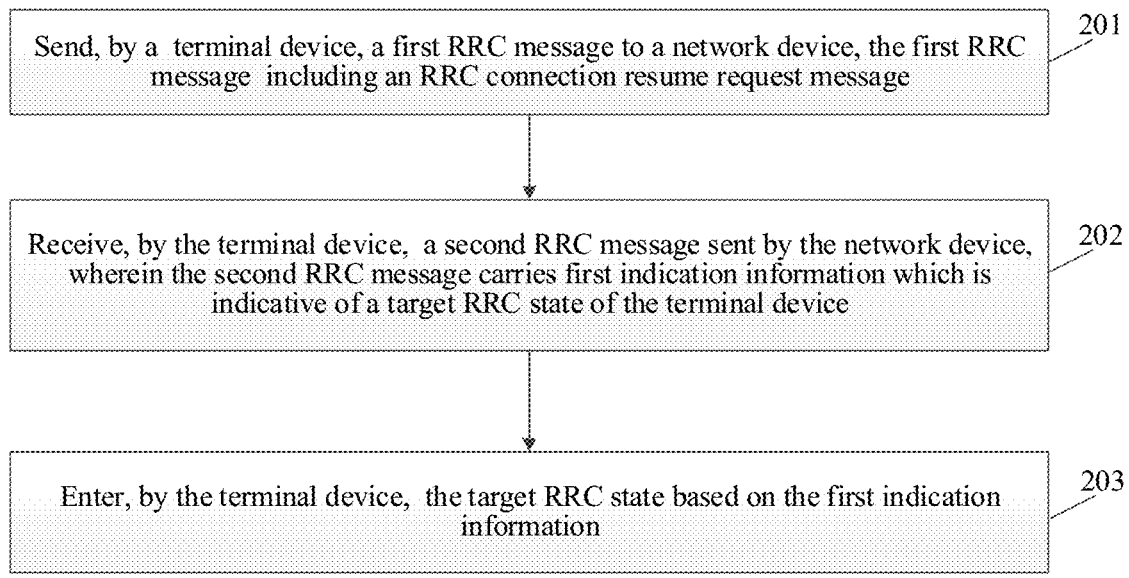
FIG. 2 is a first schematic flowchart of a method for controlling an RRC state according to an embodiment of the present disclosure.

FIG. 2 is a first schematic flowchart of a method for controlling an RRC state according to an embodiment of the present disclosure. As shown in FIG. 2, the method includes the following steps:

In step 201, a terminal device sends a first RRC message to a network device. The first RRC message includes an RRC connection resume request message.

In an embodiment of the present disclosure, the terminal may be any device which is capable of communicating with the network device, such as a mobile phone, a tablet computer, a notebook computer, a desktop computer or the like.

In an embodiment of the present disclosure, the network device refers to a base station, such as a gNB in 5G.

In an embodiment of the present disclosure, when initiating an RRC connection resume procedure, the terminal device initiates a random access procedure at first and then sends an RRC connection resume request message (corresponding to the first RRC message) to the network side in MSG3.

In step 202, the terminal device receives a second RRC message sent by the network device. The second RRC message carries first indication information, which is used for indicating a target RRC state of the terminal device.

In an embodiment of the present disclosure, the second RRC message includes an RRC connection resume message, an RRC connection release message, or a newly defined RRC message.

In an embodiment, the first RRC message carries indication information for indicating a reason for the RRC connection resume, wherein the indication information for indicating the reason for the RRC connection resume is used by the network device to determine the target RRC state of the terminal device in a connection resume procedure.

In step 203, the terminal device enters the target RRC state based on the first indication information.

In an embodiment of the present disclosure, the target RRC state is an RRC connected state, an RRC inactive state, or an RRC idle state.

In an embodiment, if the target RRC state is an RRC inactive state and the second RRC message does not carry configuration information corresponding to the RRC inactive state, after entering the RRC inactive state, the terminal device uses locally stored configuration information that corresponds to the RRC inactive state.

In an embodiment, if the target RRC state is an RRC inactive state and the second RRC message carries configuration information corresponding to the RRC inactive state, after entering the RRC inactive state, the terminal device uses the configuration information carried in the second RRC message and corresponding to the RRC inactive state.

In the above solutions, the configuration information corresponding to the RRC inactive state includes at least one of I-RNTI, RAN notification area, RAN DRX cycle, periodic RAN notification area update timer.

Figure 3:
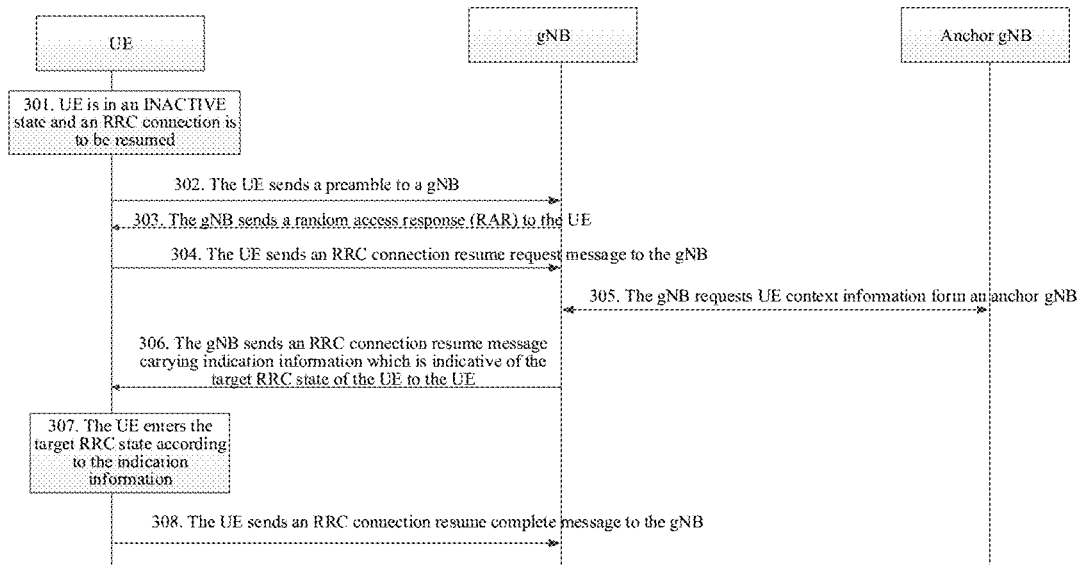
FIG. 3 is a second schematic flowchart of a method for controlling an RRC state according to an embodiment of the present disclosure.

FIG. 3 is a second schematic flowchart of a method for controlling an RRC state according to an embodiment of the present disclosure. As shown in FIG. 3, the method includes the following steps:

In step 301, a UE is in an INACTIVE state and an RRC connection is to be resumed.

In step 302, the UE sends a preamble to a gNB.

In step 303, the gNB sends a random access response (RAR) to the UE.

In step 304, the UE sends an RRC connection resume request message to the gNB.

The gNB determines a target RRC state of the UE in this RRC connection resume procedure according to indication information for indicating a reason for the RRC connection resume in the RRC connection resume request message.

In step 305, the gNB requests UE context information from an anchor gNB.

In step 306, the gNB sends an RRC connection resume message to the UE. The RRC connection resume message carries indication information which is used for indicating the target RRC state of the UE.

In step 307, the UE enters the target RRC state according to the indication information.

Here, when the RRC connection resume message does not carry configuration information corresponding to an RRC_INACTIVE state and meanwhile a network side instructs the UE to enter the RRC_INACTIVE state, the UE uses the originally stored configuration information corresponding to the RRC_INACTIVE state by default.

In step 308, the UE sends an RRC connection resume complete message to the gNB.

Here, the UE may not perform the step 308.

Figure 4:
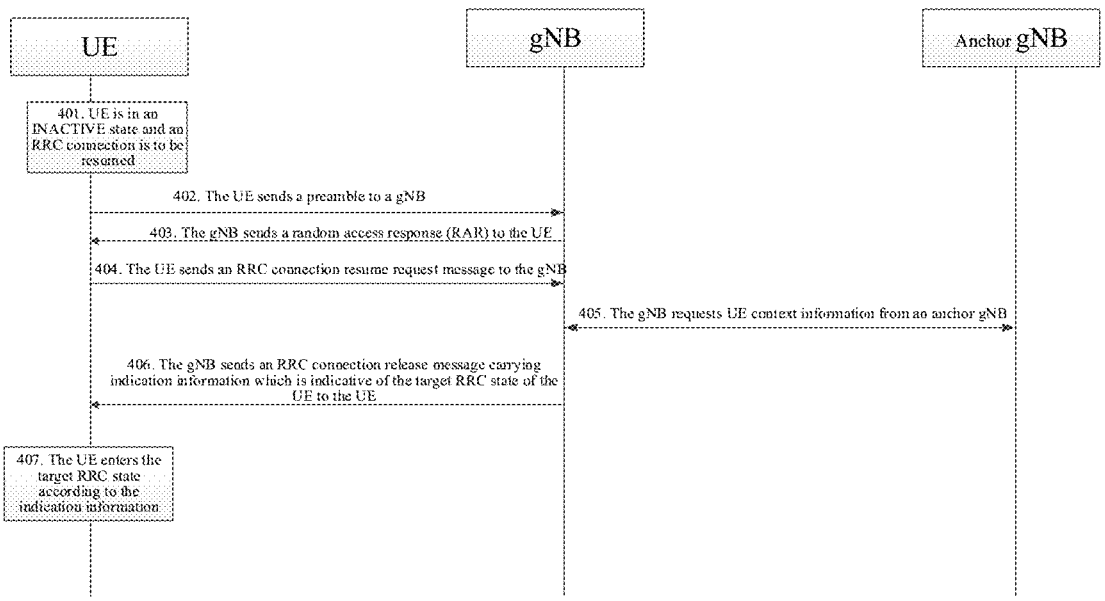
FIG. 4 is a third schematic flowchart of a method for controlling an RRC state according to an embodiment of the present disclosure.

FIG. 4 is a third schematic flowchart of a method for controlling an RRC state according to an embodiment of the present disclosure. As shown in FIG. 4, the method includes the following steps:

In step 401, a UE is in an INACTIVE state and an RRC connection is to be resumed.

In step 402, the UE sends a preamble to a gNB.

In step 403, the gNB sends a random access response (RAR) to the UE.

In step 404, the UE sends an RRC connection resume request message to the gNB.

The gNB determines a target RRC state of the UE in this RRC connection resume procedure according to indication information for indicating a reason for the RRC connection resume in the RRC connection resume request message.

In step 405, the gNB requests UE context information from an anchor gNB.

In step 406, the gNB sends an RRC connection release message to the UE. The RRC connection release message carries indication information which is used for indicating the target RRC state of the UE.

In step 407, the UE enters the target RRC state according to the indication information.

Here, when the RRC connection resume message does not carry configuration information corresponding to an RRC_INACTIVE state and meanwhile a network side instructs the UE to enter the RRC_INACTIVE state, the UE uses the originally stored configuration information corresponding to the RRC_INACTIVE state by default.

Figure 5:
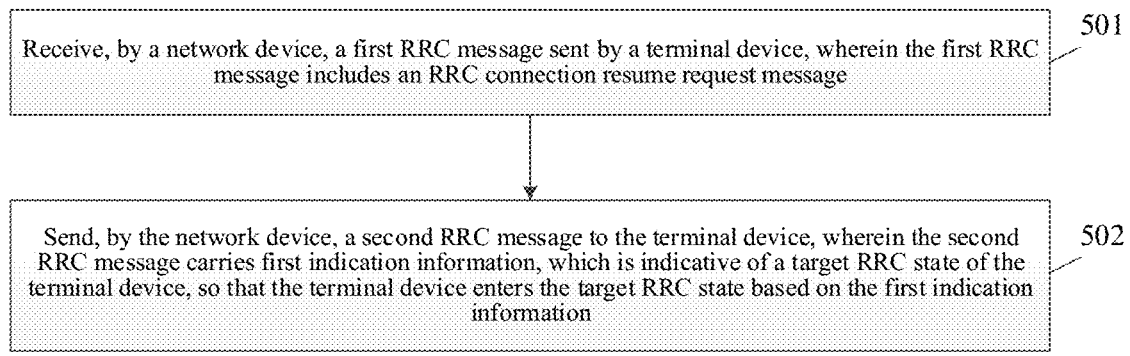
FIG. 5 is a fourth schematic flowchart of a method for controlling an RRC state according to an embodiment of the present disclosure.

FIG. 5 is a fourth schematic flowchart of a method for controlling an RRC state according to an embodiment of the present disclosure. As shown in FIG. 5, the method includes the following steps:

In step 501, a network device receives a first RRC message sent by a terminal device. The first RRC message includes an RRC connection resume request message.

In step 502, the network device sends a second RRC message to the terminal device. The second RRC message carries first indication information, which is indicative of a target RRC state of the terminal device, so that the terminal device enters the target RRC state based on the first indication information.

In an embodiment, if the target RRC state is an RRC inactive state, the second RRC message may carry configuration information corresponding to the RRC inactive state or may not carry configuration information corresponding to the RRC inactive state.

In an embodiment, the configuration information corresponding to the RRC inactive state includes at least one of I-RNTI, RAN notification area, RAN DRX cycle, periodic RAN notification area update timer.

In an embodiment, the second RRC message includes an RRC connection resume message, an RRC connection release message, or a newly defined RRC message.

In an embodiment, the first RRC message carries indication information for indicating a reason for the RRC connection resume, wherein the indication information for indicating the reason for the RRC connection resume is used by the network device to determine the target RRC state of the terminal device in a connection resume procedure.

In an embodiment, the target RRC state is an RRC connected state, an RRC inactive state, or an RRC idle state.

Figure 6:
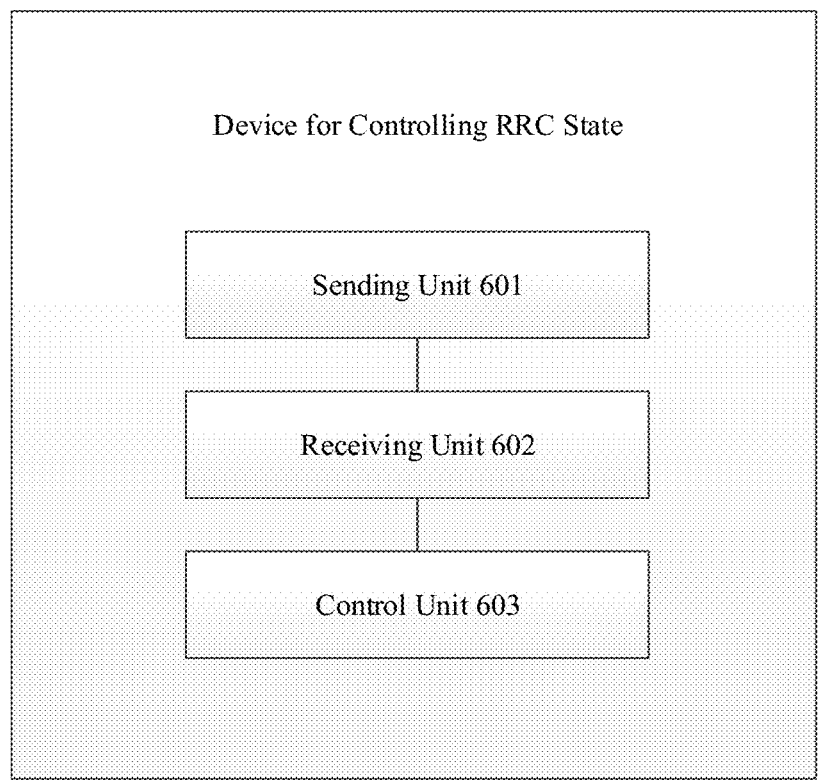
FIG. 6 is a first schematic structural diagram of a device for controlling an RRC state according to an embodiment of the present disclosure.

FIG. 6 is a first schematic structural diagram of a device for controlling an RRC state according to an embodiment of the present disclosure. As shown in FIG. 6, the device includes a sending unit 601, a receiving unit 602 and a control unit 603.

The sending unit 601 is configured to send to a network device a first RRC message which includes an RRC connection resume request message.

The receiving unit 602 is configured to receive a second RRC message sent by the network device, the second RRC message carrying first indication information which is indicative of a target RRC state of the terminal device.

The control unit 603 is configured to control the terminal device to enter the target RRC state based on the first indication information.

In an embodiment, if the target RRC state is an RRC inactive state and the second RRC message does not carry configuration information corresponding to the RRC inactive state, after entering the RRC inactive state, the terminal device uses locally stored configuration information that corresponds to the RRC inactive state.

In an embodiment, if the target RRC state is an RRC inactive state and the second RRC message carries configuration information corresponding to the RRC inactive state, after entering the RRC inactive state, the terminal device uses the configuration information that is carried in the second RRC message and corresponds to the RRC inactive state.

In an embodiment, the configuration information corresponding to the RRC inactive state includes at least one of I-RNTI, RAN notification area, RAN DRX cycle, periodic RAN notification area update timer.

In an embodiment, the second RRC message includes an RRC connection resume message, an RRC connection release message, or a newly defined RRC message.

In an embodiment, the first RRC message carries indication information for indicating a reason for the RRC connection resume, wherein the indication information for indicating the reason for the RRC connection resume is used by the network device to determine the target RRC state of the terminal device in a connection resume procedure.

In an embodiment, the target RRC state is an RRC connected state, an RRC inactive state, or an RRC idle state.

It should be appreciated by those skilled in the art that functions of the units in the RRC state control device shown in FIG. 6 will be understood with reference to the relevant descriptions of the foregoing methods for controlling the RRC state. The functions of the units in the RRC state control device shown in FIG. 6 can be implemented by programs running on a processor, or by a specific logic circuit.

Figure 7:
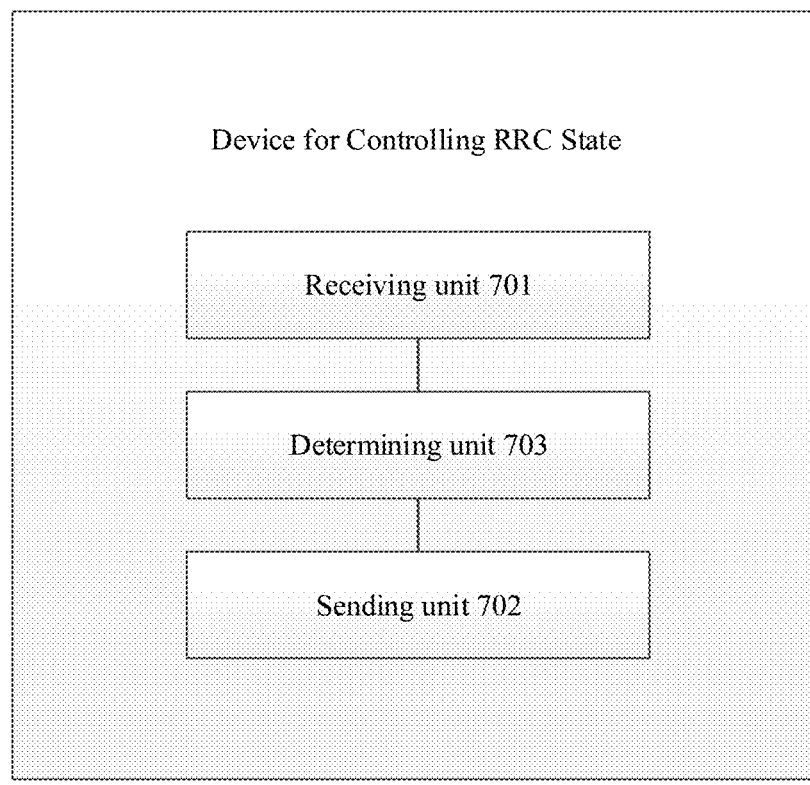
FIG. 7 is a second schematic structural diagram of a device for controlling an RRC state according to an embodiment of the present disclosure.

FIG. 7 is a second schematic structural diagram of a device for controlling an RRC state according to an embodiment of the present disclosure. As shown in FIG. 7, the device includes a receiving unit 701 and a sending unit 702.

The receiving unit 701 is configured to receive a first RRC message sent by a terminal device, the first RRC message including an RRC connection resume request message.

The sending unit 702 is configured to send a second RRC message to the terminal device, wherein the second RRC message carries first indication information, which is indicative of a target RRC state of the terminal device, so that the terminal device enters the target RRC state based on the first indication information.

In an embodiment, if the target RRC state is an RRC inactive state, the second RRC message may or may not carry configuration information corresponding to the RRC inactive state.

In an embodiment, the configuration information corresponding to the RRC inactive state includes at least one of I-RNTI, RAN notification area, RAN DRX cycle, periodic RAN notification area update timer.

In an embodiment, the second RRC message includes an RRC connection resume message, an RRC connection release message, or a newly defined RRC message.

In an embodiment, the first RRC message carries indication information for indicating a reason for the RRC connection resume, and the device further includes:

a determining unit 703 configured to determine the target RRC state of the terminal device in a connection resume procedure based on the indication information for indicating the reason for the RRC connection resume.

In an embodiment, the target RRC state is an RRC connected state, an RRC inactive state, or an RRC idle state.

It should be appreciated by those skilled in the art that functions of the units in the RRC state control device shown in FIG. 7 will be understood with reference to the relevant descriptions of the foregoing methods for controlling the RRC state. The functions of the units in the RRC state control device shown in FIG. 7 can be implemented by programs running on a processor, or by a specific logic circuit.

The devices for controlling an RRC state according to the embodiments of the present disclosure may also be stored in a computer readable storage medium when it is implemented as a software function module and sold or used as a stand-alone product. Based on this understanding, the essence of the technical solutions of the embodiments of the present disclosure, or the contribution of the technical solutions of the embodiments of the present disclosure over prior art, may be embodied in the form of a software product, and the computer software product is stored in a storage medium including a number of instructions such that a computer device (which may be a personal computer, a server, or a network device, etc.) performs all or part of the methods described in the various embodiments of the present disclosure. The foregoing storage medium includes various media that can store program codes, such as a USB flash disk, a mobile hard disk, a read-only memory (ROM), a magnetic disk, or an optical disk. Therefore the embodiments of the present disclosure are not limited to any specific combination of hardware and software.

Correspondingly, an embodiment of the present disclosure further provides a computer storage medium having computer-executable instructions stored thereon. When executed by a processor, the computer-executable instructions implement the foregoing methods for controlling the RRC state according to the embodiments of the present disclosure.

Figure 8:
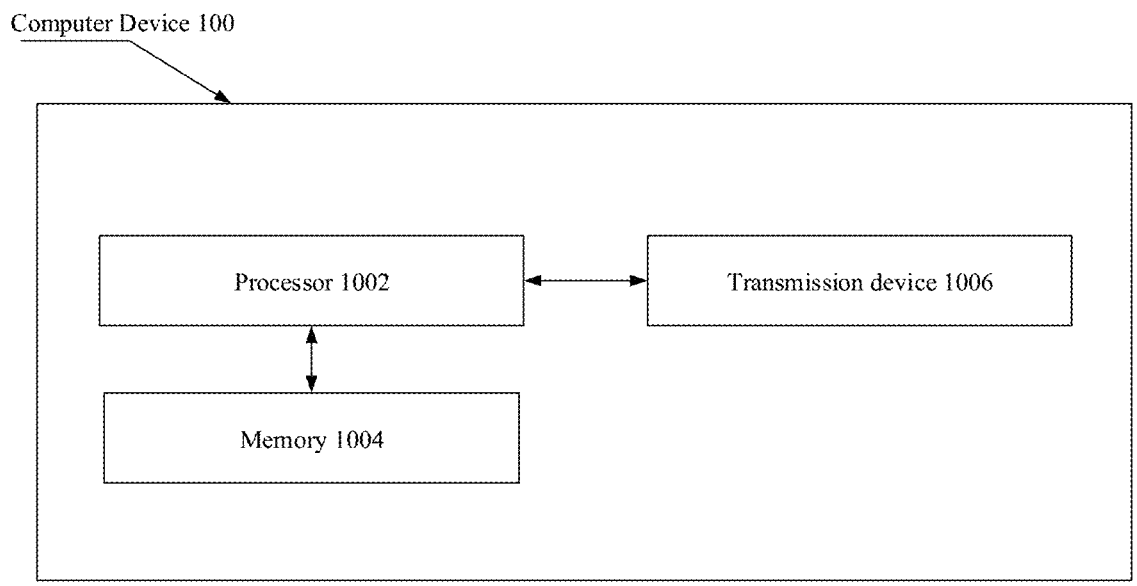
FIG. 8 is a schematic structural diagram of a computer device according to an embodiment of the present disclosure.

FIG. 8 is a schematic structural diagram of a computer device according to an embodiment of the present disclosure. The computer device may be a terminal device or a network device. As shown in FIG. 8, a computer device 100 may include one or more processor 1002 (only one processor is shown, and the processor 1002 may include, but is not limited to a process device such as a Micro Controller Unit (MCU) or a Field Programmable Gate Array (FPGA)), a memory 1004 for storing data and a transmission device 1006 for communication. It will be understood by those skilled in the art that the structure shown in FIG. 8 is merely illustrative and it does not impose any limitation on the structure of the above electronic device. For example, the computer device 100 may also include more or less components than those shown in FIG. 8, or have a different configuration from that shown in FIG. 8.

The memory 1004 may be used to store software programs and modules of application software, for example, program instructions/modules corresponding to the methods in the embodiments of the present disclosure, and the processor 1002 executes various function applications and data processing by running software programs and modules stored in the memory 1004. Namely, the above methods are implemented. The memory 1004 may include a high speed random access memory and a non-volatile memory, for example, one or more magnetic storage devices, flash memory, or other non-volatile solid state memory. In some examples, the memory 1004 may further include a remote memory which is remotely deployed from the processor 1002, which can be connected to the computer device 100 via a network. Examples of the network include, but are not limited to, the Internet, intranets, local area networks, mobile communication networks and a combination thereof.

The transmission device 1006 receives or transmits data via a network. A specific example of the network described above may include a wireless network provided by a communication provider of the computer device 100. In one example, the transmission device 1006 includes a Network Interface Controller (NIC) that can be connected to other network devices through a base station to communicate with the Internet. In one example, the transmission device 1006 can be a Radio Frequency (RF) module for communicating with the Internet wirelessly.

The technical solutions described in the embodiments of the present disclosure can be arbitrarily combined if such combination will not result in conflict.

In the embodiments provided by the present disclosure, it should be understood that the disclosed methods and smart devices may be implemented in other ways. The device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts shown as units may or may not be physical units, that is, may be located in one place, or may be distributed over multiple network units. Some or all of the units may be selected according to actual needs to achieve the objectives of the solutions in the embodiments.

In addition, each functional unit in each embodiment of the present application may be integrated in one second processing unit, or each unit may exist alone physically, or two or more units may be integrated in one unit. The above integrated units can be implemented with hardware and software functional units.

The exemplary embodiments of the present disclosure are described above, the scope of the present disclosure is not limited thereto. Any person skilled in the art can easily think of changes or substitutions that should fall into the scope of the present disclosure.

What is claimed is:

1. A method for controlling an RRC state in a UE-initiated RRC connection resume procedure, comprising:
   sending, by a terminal device which is in an inactive state, a radio resource control (RRC) connection resume request message to a network device;
   receiving, by the terminal device, an RRC connection release message sent from the network device in response to the connection resume request message, the RRC connection release message carrying first indication information which indicates a target state of the terminal device; and
   entering, by the terminal device, the target RRC state based on the first indication information;
   wherein in response to the target RRC state being an RRC inactive state and the RRC connection release message carrying at least one of I-RNTI, radio access network (RAN) discontinuous reception (DRX) cycle, and periodic RAN notification area update timers, after entering the RRC inactive state, the terminal device uses the at least one of I-RNTI, RAN DRX cycle, and periodic RAN notification area update timers; and
   wherein in response to the target RRC state being an RRC inactive state and the RRC connection release message not carrying the at least one of I-RNTI, RAN DRX cycle, and periodic RAN notification area update timers, after entering the RRC inactive state, the terminal device uses locally stored at least one of I-RNTI, RAN DRX cycle, and periodic RAN notification area update timers;
   wherein in response to the target RRC state as indicated in first indication information carried in the RRC connection release message being an RRC idle state, entering, by the terminal device, the RRC idle state;
   wherein in response to the target RRC state as indicated in first indication information carried in the RRC connection release message being an RRC connected state, entering, by the terminal device, the RRC connected state.

2. The method according to claim 1, wherein the RRC connection resume request message carries indication information for indicating a reason for the RRC connection resume, wherein the indication information for indicating the reason for the RRC connection resume is used by the network device to determine the target state of the terminal device in a connection resume procedure.

3. A method for controlling an RRC state in a UE-initiated RRC connection resume procedure, comprising:
   receiving, by a network device, a radio resource control (RRC) connection resume request message sent from a terminal device which is in an inactive state; and
   sending, by the network device, an RRC connection release message to the terminal device in response to the connection resume request message, the RRC connection release message carrying first indication information which indicates a target RRC state of the terminal device,
   wherein the terminal device enters the target RRC state based on the first indication information, wherein in response to the target RRC state being an RRC inactive state and the RRC connection release message carrying at least one of I-RNTI, radio access network (RAN) discontinuous reception (DRX) cycle, and periodic RAN notification area update timers, after entering the RRC inactive state, the terminal device uses the at least one of I-RNTI, RAN DRX cycle, and periodic RAN notification area update timers configuration information that is carried in RRC connection release message; and
   wherein in response to the target RRC state being an RRC inactive state and the RRC connection release message not carrying at least one of I-RNTI, RAN DRX cycle, and periodic RAN notification area update timers, after entering the RRC inactive state, the terminal device uses locally stored at least one of I-RNTI, RAN DRX cycle, and periodic RAN notification area update timers;
   wherein in response to the target RRC state as indicated in first indication information carried in the RRC connection release message being an RRC idle state, the terminal device enters the RRC idle state; and
   wherein in response to the target RRC state as indicated in first indication information carried in the RRC connection release message being an RRC connected state, the terminal device enters the RRC connected state.

4. The method according to claim 3, wherein the RRC connection resume request message carries indication information for indicating a reason for the RRC connection resume, wherein the indication information for indicating the reason for the RRC connection resume is used by the network device to determine the target state of the terminal device in a connection resume procedure.

5. A terminal device, comprising:
   a processor;
   a transmission device;
   a memory for storing instructions executable by the processor;
   wherein the processor is configured to control the transmission device to:
   in a UE-initiated RRC connection resume procedure, send to a network device a radio resource control (RRC)

connection resume request message when the terminal device is in an inactive state;

receive an RRC connection release message sent from the network device in response to the connection resume request message, the RRC connection release message carrying first indication information which indicates a target state of the terminal device; and wherein the processor is further configured to: enter the target RRC state based on the first indication information;

wherein in response to the target RRC state being an RRC inactive state and the RRC connection release message carrying at least one of I-RNTI, radio access network (RAN) discontinuous reception (DRX) cycle, and periodic RAN notification area update timers, after entering the RRC inactive state, the terminal device uses the at least one of I-RNTI, RAN DRX cycle, and periodic RAN notification area update timers; and wherein in response to the target RRC state being an RRC inactive state and the RRC connection release message not carrying at least one of I-RNTI, RAN DRX cycle, and periodic RAN notification area update timers, after entering the RRC inactive state, the terminal device uses locally stored at least one of I-RNTI, RAN DRX cycle, and periodic RAN notification area update timers;

wherein in response to the target RRC state as indicated in first indication information carried in the RRC connection release message being an RRC idle state, the terminal device enters the RRC idle state;

wherein in response to the target RRC state as indicated in first indication information carried in the RRC connection release message being an RRC connected state, the terminal device enters the RRC connected state.

6. The device according to claim 5, wherein the RRC connection resume request message carries indication information for indicating a reason for the RRC connection resume, wherein the indication information for indicating the reason for the RRC connection resume is used by the network device to determine the target state of the terminal device in a connection resume procedure.

* * * * *